United States Patent [19]

Keogh

[11] 4,115,884

[45] Sep. 26, 1978

[54] STRETCHER SUPPORTING STRUCTURE FOR AIRPLANES, OR THE LIKE

[75] Inventor: Marvin J. Keogh, North Hollywood, Calif.

[73] Assignee: Air Medic, Inc., North Hollywood, Calif.

[21] Appl. No.: 837,587

[22] Filed: Sep. 28, 1977

[51] Int. Cl.² ............................................ A47B 83/04
[52] U.S. Cl. ......................................... 5/82 R; 5/94; 244/118 R; 296/19
[58] Field of Search ............ 296/19 RO; 244/118 R, 244/118 P, 122 R; 297/384, 390; 211/13; 5/81 R, 82 R, 94

[56] References Cited

U.S. PATENT DOCUMENTS

| 2,276,236 | 3/1942 | Latimer | 296/19 |
| 2,337,505 | 12/1943 | Swift | 296/19 |
| 2,605,064 | 7/1952 | Davis | 244/118 R |
| 2,640,996 | 6/1953 | Davis | 5/82 |
| 3,424,497 | 1/1969 | Brilmyer et al. | 297/390 |
| 3,784,990 | 1/1974 | Elisofon et al. | 5/94 |

Primary Examiner—Casmir A. Nunberg
Attorney, Agent, or Firm—Harris, Kern, Wallen & Tinsley

[57] ABSTRACT

A stretcher supporting structure for use in an airplane, including an elongated stretcher supporting frame adapted to be positioned generally horizontally in the airplane, two leg assemblies connected to the frame adjacent the respective ends thereof, means for connecting the leg assemblies to the floor of the airplane, two straps connected to the frame on opposite sides thereof adjacent each leg assembly, and means for anchoring the other ends of the straps to the airplane with the straps oriented diagonally downwardly to brace the frame and its supporting leg assemblies. The stretcher supporting structure may be installed in the airplane in the space normally occupied by one or two of the seats with which the airplane is equipped, or it may be installed in a similar space with the corresponding seat back or backs folded downwardly and with the stretcher supporting frame located above such seat backs.

6 Claims, 5 Drawing Figures

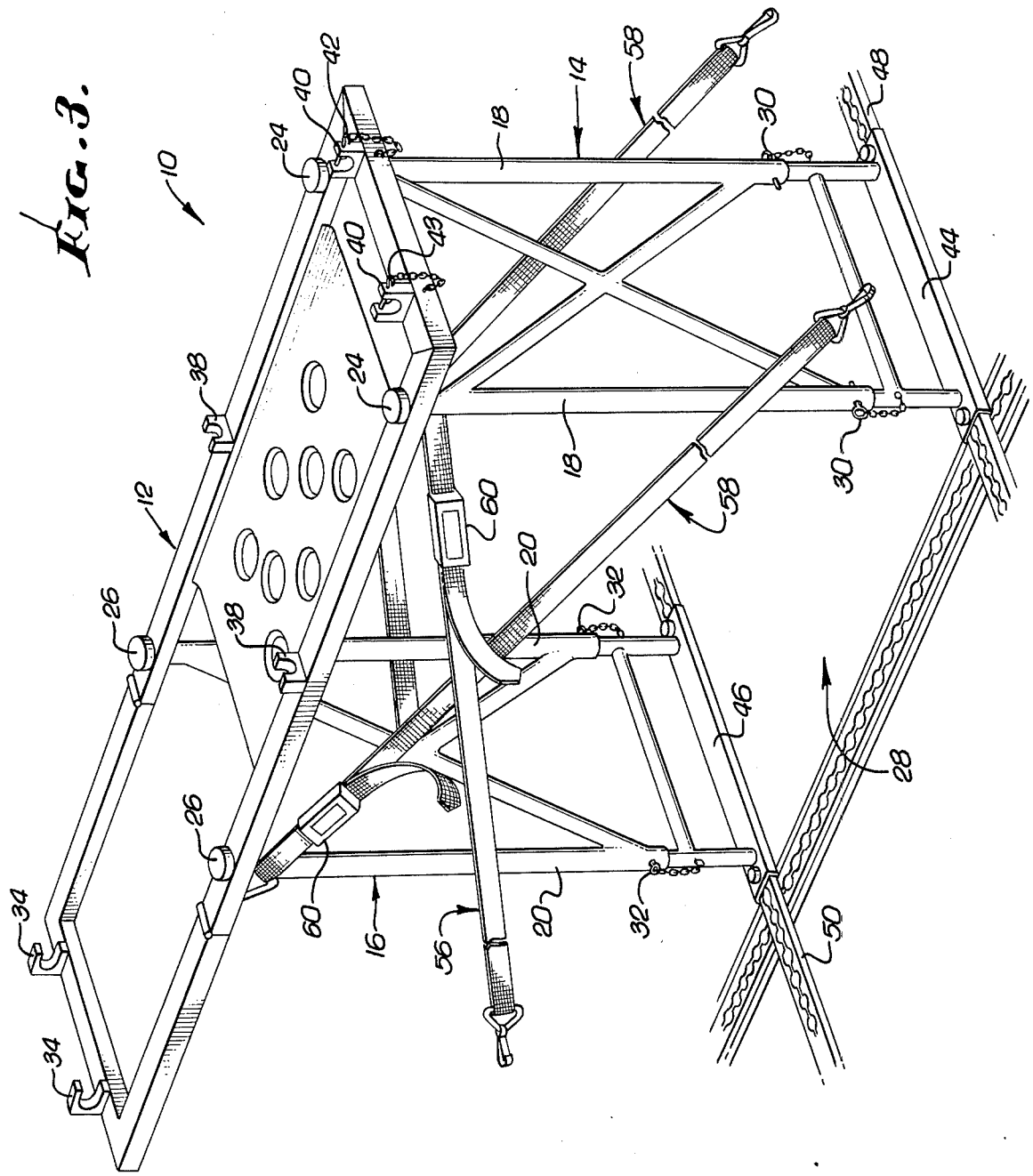

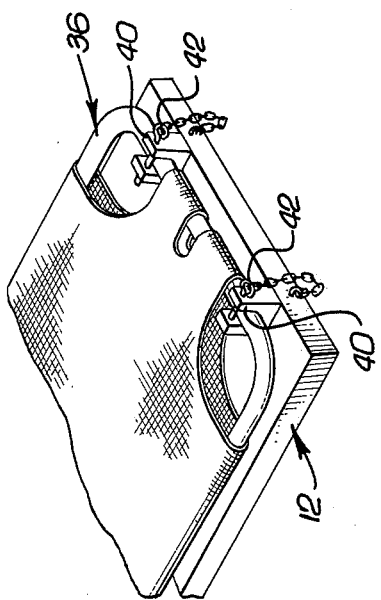
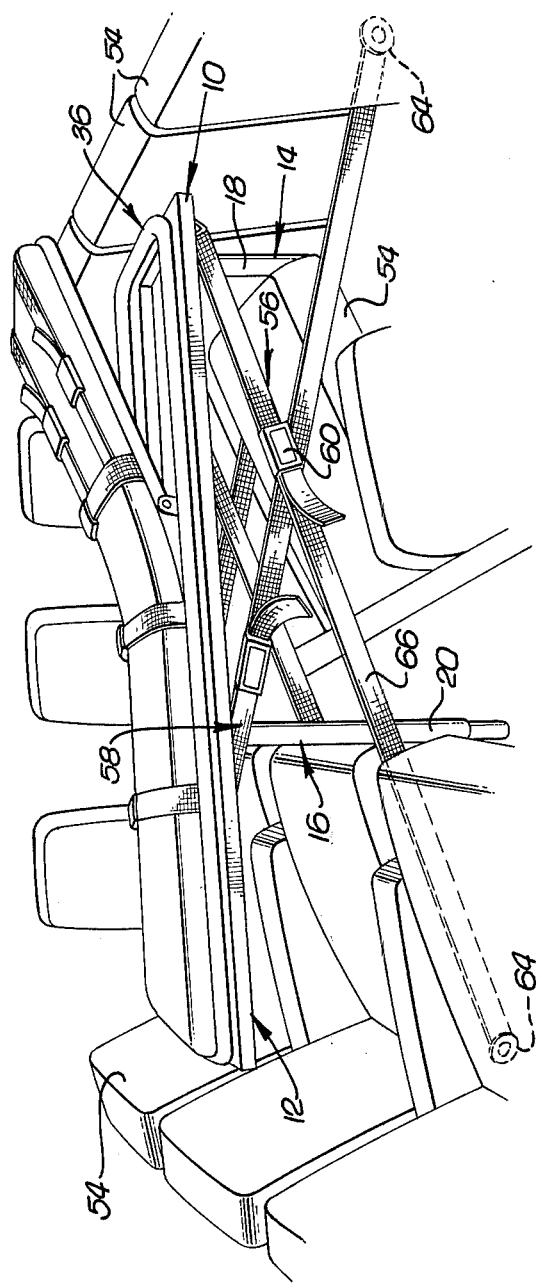

STRETCHER SUPPORTING STRUCTURE FOR AIRPLANES, OR THE LIKE

BACKGROUND OF INVENTION

The present invention relates in general to a stretcher supporting structure for use in an airplane, or other vehicle, its use in a conventional passenger airplane being considered herein for convenience of disclosure. More particularly, the invention contemplates a stretcher supporting structure which can be installed in the space normally occupied by one or two seats of the airplane, or which can be installed in the same space with the corresponding seat back or backs folded downwardly and with a stretcher supporting frame of the structure positioned above such downwardly folded seat backs.

The following prior art, all U.S. patents, is relevant to some degree:

| Patent No. | Patentee |
| --- | --- |
| 2,848,723 | Arcand |
| 3,601,824 | Bradford |
| 3,606,619 | Stollenwerk |
| 3,608,737 | Stollenwerk |
| 3,648,305 | Ersek |
| 3,815,164 | Smith |
| 3,886,610 | Shelden |
| 4,011,609 | Bethlen |

Some of the foregoing patents show the basic idea of a stretcher for carrying a patient and a separate supporting structure on which the stretcher may be mounted, with the stretcher being removable from the supporting structure.

SUMMARY AND OBJECTS OF INVENTION

The primary object of the present invention is to provide a supporting structure for a removable stretcher which can readily be installed in a conventional passenger airplane, either in the space normally occupied by one or two seats, or in the same space with the backs of the seats folded downwardly.

More particularly, the invention may be summarized as comprising, and an important object of the invention is to provide a stretcher supporting structure for use in an airplane, or other vehicle, which includes an elongated stretcher supporting frame adapted to be positioned generally horizontally in the airplane, two leg assemblies or leg means connected to the frame adjacent the respective ends thereof, means for connecting the two leg assemblies to the floor of the airplane, two straps connected to the frame on opposite sides thereof adjacent each leg assembly, and means for anchoring the other ends of the four straps to the airplane with the straps oriented diagonally downwardly to brace the stretcher supporting frame and its leg assemblies. Preferably, the leg assemblies are pivotally connected to and adapted to be locked relative to the stretcher supporting frame so that, in carrying the supporting structure into or out of the airplane, the leg assemblies can be folded upwardly for compactness.

Another object of the invention is to provide a stretcher supporting structure of the foregoing nature wherein the bracing straps can be anchored to the airplane in various ways. For example, means may be provided for anchoring the lower ends of the straps directly to the floor of the airplane, or to the seat belt anchors which are conventionally present. Another possibility is to anchor the bracing straps of the stretcher supporting structure to the seat belt straps with which the seats are conventionally equipped.

The invention may be further summarized as including, and another important object is to provide a stretcher supporting structure which includes, hook means adjacent one end of the stretcher supporting frame facing longitudinally of the frame toward the other end thereof and adapted to receive one end of a stretcher, upwardly facing hook means adjacent to the other end of the stretcher supporting frame and adapted to receive the other end of the stretcher, and means for securing the other end of the stretcher in the upwardly facing hook means.

Thus, the invention provides a stretcher supporting structure which can readily be installed in and removed from a conventional passenger airplane, or other vehicle, and which includes means for quickly and easily mounting a stretcher on, or removing it from, a supporting frame of the structure, which are important features of the invention.

The foregoing objects, advantages, features and results of the present invention, together with various other objects, advantages, features and results which will become apparent in the light of this disclosure, may be achieved with the exemplary embodiments of the invention illustrated in the accompanying drawings, and described in detail hereinafter.

DESCRIPTION OF DRAWINGS

FIG. 3 is another perspective view showing the stretcher supporting structure in more detail and illustrating the manner in which it may be secured to the floor of the airplane;

FIG. 4 is a fragmentary perspective view showing a locking means for securing one end of a stretcher to the stretcher supporting structure; and FIG. 5 is another perspective view showing the stretcher supporting structure as installed with the bracing straps secured to the conventional seat belt straps of the airplane.

DESCRIPTION OF EXEMPLARY EMBODIMENTS OF INVENTION

Figure 2:
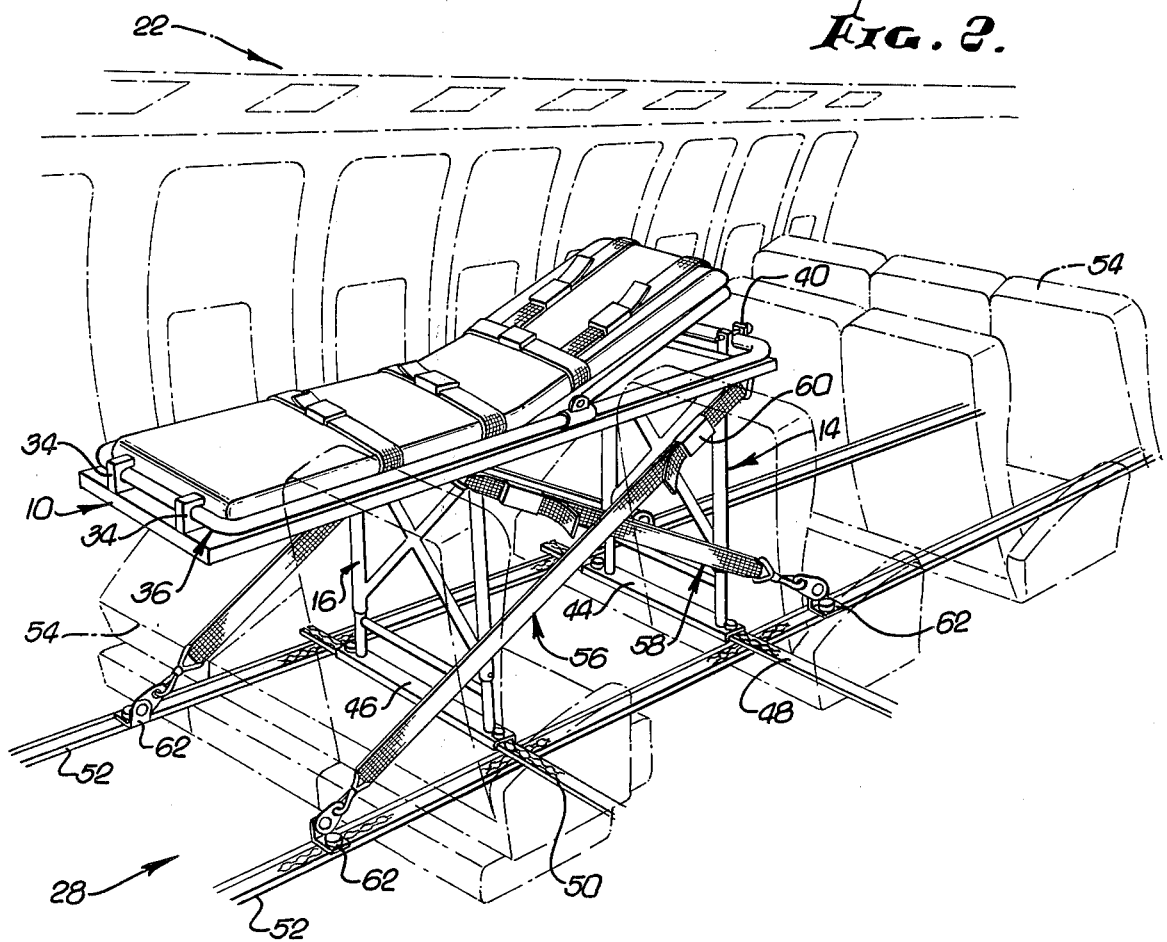
FIG. 2 is another perspective view showing the stretcher supporting stucture installed over two downwardly folded seat backs, with bracing straps of the stretcher supporting structure connected to the floor of the airplane, and, more specifically, to the longitudinal structural members to which the seats themselves are normally attached.

Referring initially to FIGS. 2 and 3 of the drawings, and especially FIG. 3, the stretcher supporting structures of the invention is designated generally by the numeral 10 and includes an elongated stretcher supporting frame 12 mounted at one end on a leg assembly or means 14 and adjacent its other end on a leg assembly or means 16. The leg assembly 14 includes two interconnected and telescoping legs 18 and, similarly, the leg assembly 16 includes two interconnected and telescoping legs 20.

Figure 1:
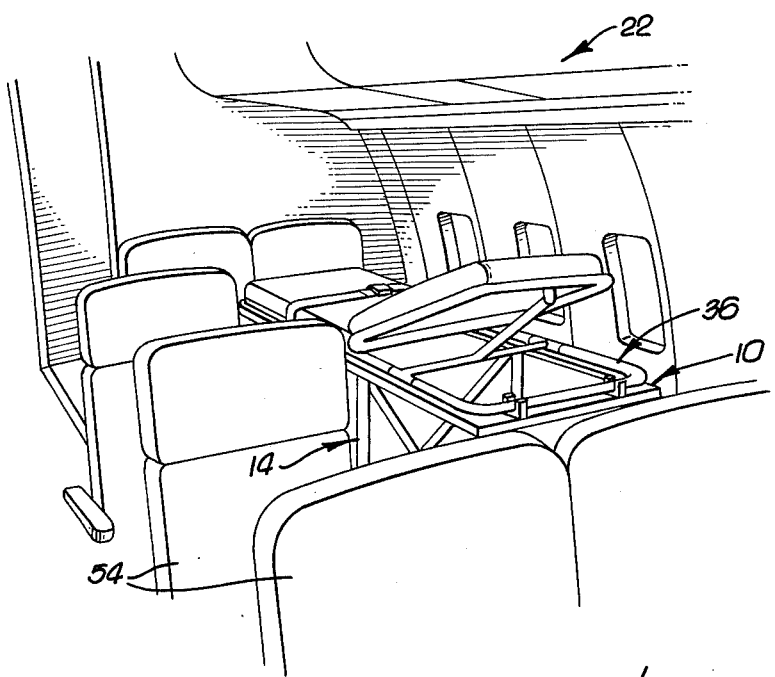
FIG. 1 is a perspective view showing a stretcher supporting structure of the invention installed in the passenger section of a conventional airplane.

The upper ends of the legs 18 and 20 are preferably pivotally connected to the stretcher supporting frame 12, in a manner not specifically shown, to permit folding the leg assemblies 14 and 16 upwardly for convenience in transporting the stretcher supporting structure 10 into and out of the passenger section 22 of an airplane, FIGS. 1 and 2. The legs 18 and 20 are locked in their depending extended positions by locking devices 24 and 26, respectively. The height of the stretcher supporting frame 12 above the floor 28 of the airplane 22 may be adjusted by adjusting the lengths of the legs 18 and 20, and by locking the telescoping portions of the legs relative to each other with locking devices 30 and 32.

The stretcher supporting frame 12 is provided at one end with a hook means, comprising two hooks 34, which face horizontally toward the opposite end of the supporting frame, and which are adapted to receive therein one end of a stretcher frame 36, as best shown in FIG. 2. The sides of the stretcher frame 36 rest in seats 38 intermediate the ends of the supporting frame 12. The opposite end of the stretcher frame 36 rests in upwardly facing hooks 40 at the opposite end of the supporting frame 12, and is secured by locking devices 42, as will be clear from FIGS. 2 and 3.

The lower ends of the telescoping legs 18 and 20 are rigidly interconnected by cross members 44 and 46 which, in turn, are bolted, or otherwise connected, to crosspieces 48 and 50 suitably secured, in a manner not specifically shown, to the longitudinal attachment strips which are normally installed in the airplane 22 flush with the floor 28, and to which the seats 54 of the airplane are conventionally anchored.

As suggested in FIG. 1, the stretcher supporting structure 10 may be installed in the space normally occupied by one or two seats. Alternatively, as shown in FIGS. 2 and 5, the stretcher supporting structure 10 may be installed with the stretcher supporting frame 12 located above the downwardly folded seat back or backs of one or two seats. In this case, the legs 18 and 20 are so adjusted to position the stretcher supporting frame 12 above the downwardly folded seat back or backs.

The stretcher supporting frame 12, and the leg assemblies 14 and 16 on which it is mounted, are braced in the longitudinal direction, against aircraft acceleration and deceleration, by two pairs of diagonal straps 56 and 58 respectively connected to the supporting frame 12 adjacent the upper ends of the legs 18 and 20. The front straps 56 extend downwardly and rearwardly while the rear straps 58 extend downwardly and forwardly, the lower ends of all four straps being anchored to the structure of the airplane 22 in one of several different ways, as will be described. Each strap 56 and 58 is provided with a device 60, which may be similar to a seat belt buckling device, for tensioning same.

Considering the manner in which the straps 56 and 58 are anchored, FIG. 2 shows them as secured to anchors 62 bolted, or otherwise attached, to the longitudinal seat attachment strips 52. An alternative way of anchoring the lower ends of the straps 56 and 58 is to attach them to the seal belt anchors with which the airplane 22 is normally equipped. FIG. 5 shows one of the straps 56 secured to a seat belt anchor 64. Another possibility is to utilize as a part of each strap 56 and 58 one of the seat belts with which the airplane 22 is equipped. For example, as shown in FIG. 5, the portion 66 of the strap 56 may be regarded as a conventional seat belt.

Irrespective of how the front and rear straps 56 and 58 are anchored to the airplane, these straps, when tensioned, serve to brace the stretcher supporting frame 12 and its leg assemblies 14 and 16 against acceleration and deceleration forces.

As will be apparent, the stretcher supporting structure 10 can be installed in the airplane 22 readily when needed, and can be removed easily when no longer required. When installed, the stretcher supporting structure 10 is firmly secured to the floor 28 of the airplane 22 and is braced in a positive manner against fore-and-aft forces. The stretcher frame 36 can be secured to and detached from the stretcher supporting frame 12 easily, which is another important feature.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. A stretcher supporting structure for use in an airplane, or other vehicle, including:
   (a) an elongated stretcher supporting frame adapted to be positioned generally horizontally;
   (b) hook means adjacent one end of said frame facing longitudinally of said frame toward the other end thereof and adapted to receive one end of the stretcher;
   (c) upwardly facing hook means adjacent said other end of said frame and adapted to receive the other end of the stretcher; and
   (d) means for securing the other end of the stretcher in said upwardly facing hook means.

2. A stretcher supporting structure for use in an airplane, or other vehicle, including:
   (a) an elongated stretcher supporting frame adapted to be positioned generally horizontally in the vehicle;
   (b) two leg means connected to said frame adjacent the respective ends thereof;
   (c) means for connecting said leg means to a floor of the vehicle;
   (d) two straps connected to said frame on opposite sides thereof adjacent each leg means; and
   (e) means for anchoring the other ends of said straps to the vehicle with said straps oriented diagonally downwardly to diagonally brace said frame and its supporting leg means, said straps connected to said frame adjacent one of said leg means and said straps connected to said frame adjacent the other of said leg means being crossed.

3. The structure set forth in claim 2 including means for anchoring said straps to the floor of the vehicle.

4. The structure defined in claim 2 including means for anchoring said straps to seat belt anchors of the vehicle.

5. The structure according to claim 2 including means for anchoring said straps to seat belt straps of the vehicle.

6. The structure set forth in claim 2 wherein said leg means are of sufficient length to support said frame above downwardly folded seats of the vehicle.

* * * * *